United States Patent [19]
Béchade et al.

[11] Patent Number: 4,768,161
[45] Date of Patent: Aug. 30, 1988

[54] DIGITAL BINARY ARRAY MULTIPLIERS USING INVERTING FULL ADDERS

[75] Inventors: Roland A. Béchade, South Burlington; William K. Hoffman, Milton; Clarence R. Ogilvie, Huntington, all of Vt.

[73] Assignee: International Business Machines Corporation, Armonk, N.Y.

[21] Appl. No.: 930,176

[22] Filed: Nov. 14, 1986

[51] Int. Cl.[4] .............................................. G06F 7/52
[52] U.S. Cl. .................................................... 364/758
[58] Field of Search ................ 364/758, 757, 759, 760

[56] References Cited

U.S. PATENT DOCUMENTS

| | | | |
|---|---|---|---|
| 3,249,746 | 5/1966 | Helig | 235/175 |
| 3,465,133 | 9/1969 | Booher | 235/175 |
| 3,670,956 | 6/1972 | Calhoun | 235/164 |
| 3,752,971 | 8/1973 | Calhoun | 235/164 |
| 3,900,724 | 8/1975 | McIver | 235/164 |
| 4,130,878 | 12/1978 | Balph et al. | 364/758 |
| 4,363,107 | 12/1982 | Ohhashi | 364/758 |
| 4,369,500 | 1/1983 | Fette | 364/758 |
| 4,432,066 | 2/1984 | Benschop | 364/758 |
| 4,495,593 | 1/1985 | Ware | 364/757 |

OTHER PUBLICATIONS

"A GaAs 16×16 Bit Parallel Multiplier" by Y. Nakayama in IEEE Journal of Solid State Circuits, vol. SC-18, No. 15, Oct. 1983, pp. 599–603.

"Selective Powering of Ripple ALU For Improved Power Performance" in I.B.M. Technical Disclosure Bulletin, vol. 27, No. 6, Nov. 1984, pp. 3214–3215, by R. A. Bechade.

"Programmable Arithmetic/Logic Circuit" in I.B.M. Technical Disclosure Bulletin by R. A. Bechade and W. K. Hoffman vol. 23, No. 11, Apr. 1981, pp. 4870–4873.

*Primary Examiner*—David H. Malzahn
*Attorney, Agent, or Firm*—Stephen J. Limanek

[57] ABSTRACT

Digital binary multipliers are provided which include first and second inverting full adders, each having first, second and third input terminals and first and second output terminals, the first output terminal of the first adder being connected to the first input terminal of the second adder with the first, second and third input terminals and the first and second output terminals of the second adder having a relationship with respect to the input and output terminals of the first adder such that corresponding input and output terminals have opposite signal polarities or complementary terminals, i.e., when one of these input or output terminals of the first adder has a true polarity signal, its corresponding input or output terminal of the second adder has a complemented polarity signal.

37 Claims, 7 Drawing Sheets

DIGITAL BINARY ARRAY MULTIPLIERS USING INVERTING FULL ADDERS

DESCRIPTION

TECHNICAL FIELD

This invention relates to array type multipliers and more particularly to multipliers which use inverting or complementary mode full adder cells or circuits.

BACKGROUND ART

Digital binary multipliers using full adders are well known, as disclosed in, e. g., U.S. Pat. Nos. 3,752,971, filed by D. F. Calhoun et al on Oct. 18, 1971; 4,130,878, filed by T. J. Balph et al on Apr. 3, 1978; 4,432,066, filed by N. F. Benschop on July 13, 1981; and 4,495,593, filed by F. A. Ware on July 1, 1982. Also, parallel multipliers using full adders are described in an article entitled "A GaAs 16×16 bit Parallel Multiplier" by Y. Nakayama et al in IEEE Journal of Solid-State Circuits, VOL. SC-18, NO. 5, October 1983, pp. 599–603. Furthermore, binary multipliers having inverting full adders are taught in U.S. Pat. Nos. 3,670,956, filed by D. F. Calhoun on Apr. 23, 1971 and 3,900,724, filed by G. W. McIver et al on Feb. 11, 1974. A ripple arithmetic logic unit (ALU) is disclosed in IBM Technical Disclosure Bulletin, Vol. 27 No. 6 November 1984, pp. 3214–3215, in an article entitled "Selective Powering of Ripple ALU for Improved Power Performance" by R. A. Bechade and an inverting full adder of the N channel metal oxide semiconductor (NMOS) type is disclosed in IBM Technical Disclosure Bulletin, Vol. 23 No. 11, April 1981, pp. 4870–4873, in an article entitled "Programmable Arithmetic/Logic Circuit" by R. A. Bechade and W. K. Hoffman. Adder or arithmetic circuits are also disclosed in U.S. Pat. No. 3,249,746 filed by W. A. Helig, et al, on Oct. 17, 1961 and in U.S. Pat. No 3,465,133 filed by R. K. Booher on June 7, 1966.

Although the digital binary multipliers disclosed in the hereinabove identified references satisfactorily provide the product of a multiplicand word and a multiplier word, the circuitry required to make these multipliers in integrated circuit form utilizes a relatively large amount of space on the surface of a semiconductor substrate or chip. Also, the circuitry used in these multipliers causes relatively large delays in their operation.

DISCLOSURE OF THE INVENTION

It is an object of this invention to provide digital binary multipliers which require significantly fewer devices and less space on the surface of a semiconductor substrate or chip and which operate at higher speeds than do known multipliers.

In accordance with the teachings of this invention, digital binary multipliers are provided which include first and second inverting full adders, each having first, second and third input terminals and first and second output terminals, the first output terminal of the first adder being connected to the first input terminal of the second adder with the first, second and third input terminals and the first and second output terminals of the second adder having a relationship with respect to the input and output terminals of the first adder such that corresponding input and output terminals have opposite polarities or complementary terminals, i. e., when one of these input or output terminals of the first adder has a true polarity signal, which may be designated as a true polarity signal input terminal or a true polarity signal output terminal, its corresponding input or output terminal of the second adder has a complemented polarity signal, which may be designated as a complemented polarity signal input terminal or a complemented polarity signal output terminal.

In one particular embodiment of the invention, the multiplier includes a first inverting full adder having a first input for receiving a true sum signal or a partial product signal, a second input for receiving a true partial product signal and a third input for receiving a complemented carry signal and having a first output for providing a true sum signal and a second output for providing a true carry signal, and a second inverting full adder having a first input for receiving a complemented sum signal, a second input for receiving a complemented partial product signal and a third input for receiving the true carry signal from the second output of the first inverting full adder and having a first output for providing a complemented sum signal and a second output for providing a complemented carry signal. A NOR circuit is preferably used to apply the true partial product signal to the second input of the first inverting full adder and a NAND circuit is preferably used to apply the complemented partial product signal to the second input of the second inverting full adder. The multiplier of this embodiment may also include a third inverting full adder which has similar input and output polarities as that of the first inverting full adder with the true sum signal of the first inverting full adder being applied to the first input of the third full adder and a fourth inverting full adder which has similar input and output polarities as that of the second inverting full adder with the complemented sum signal of the second inverting full adder being applied to the first input of the fourth inverting full adder. A second NOR circuit applies the true partial product signal to the second input of the third inverting full adder and a second NAND circuit applies a complemented partial product signal to the second input of the fourth inverting full adder.

The foregoing and other objects, features and advantages of the invention will be apparent from the following and more particular description of the preferred embodiments of the invention, as illustrated in the accompanying drawings.

BRIEF DESCRIPTION OF THE DRAWINGS

FIG. 1, illustrate in block form additional embodiments of the multiplier of the present invention each indicating two inverting full adders.

BEST MODE FOR CARRYING OUT THE INVENTION

Figure 1:
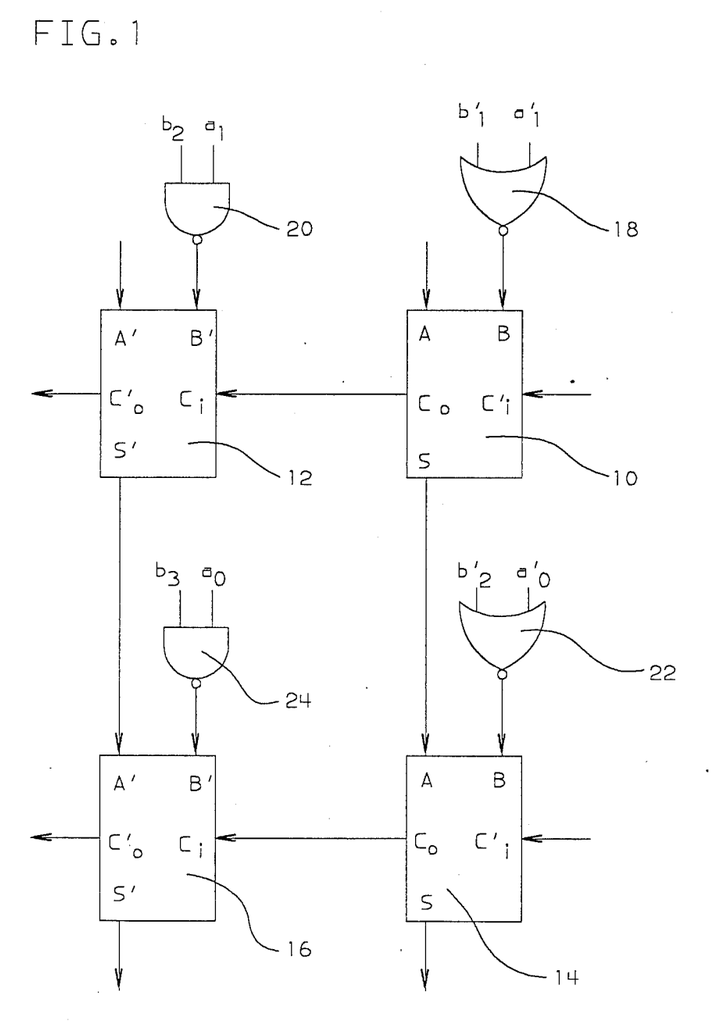
FIG. 1 illustrates in block form one embodiment of the multiplier of the present invention showing four inverting full adders.

Referring to the drawings in more detail, there is illustrated in FIG. 1 a basic schematic diagram in block form of four inverting full adders 10, 12, 14 and 16 which may be used in one embodiment of the multiplier of the present invention. As indicated in FIG. 1, an inverting full adder is an adder wherein at least one terminal thereof has a true polarity binary digit signal and at least one other terminal has a complemented polarity binary digit signal. The first adder 10 includes three input terminals A, B and $C'_i$, i.e., $C_i$ not, and two output terminals S and $C_o$. Terminal A may be more specifically designated as true polarity signal input terminal A, terminal B may be true polarity signal input terminal B, terminal $C'_i$ as complemented polarity signal input terminal $C'_i$, terminal S as true polarity signal output terminal S and terminal $C_o$ as true polarity signal output terminal $C_o$. The characters A, B, S and $C_o$ indicate that a true signal is present at each of these terminals, whereas the $C'_i$ indicates that the carry signal applied to that terminal is complemented. Applied to the terminal A is a true sum signal from a previous stage of the multiplier or a true partial product from a NOR circuit (not shown), to terminal B is applied a true partial product signal from a NOR circuit 18 to which are applied an appropriate complemented binary digit from a multiplicand word and an appropriate complemented binary digit from a multiplier word, such as, $a'_i$, i.e., $a_1$ not, from multiplicand word $a_0a_1a_2a_3$ and $b'_1$ from multiplier word $b_0b_1b_2b_3$, and to terminal $C'_i$ a complemented carry signal from a previous stage of the multiplier, or, if adder 10 is to be used as a half adder, a 1 binary digit so as not to affect the final product. The adder 10 provides a true sum signal at the output terminal S and a true carry signal at the output terminal $C_o$.

The second adder 12 also includes three input terminals A', B' and $C_i$ and two output terminals S' and $C'_o$ the output terminal $C_o$ of the first adder 10 being connected to the input terminal $C_i$ of the second adder 12. The character $C_i$ indicates that a true carry signal is applied to this terminal, whereas the characters A', B', S' and $C'_o$ indicate that complemented signals are present at each of these terminals. Applied to terminal A' is a complemented sum signal from a previous stage of the multiplier (not shown) or a complemented partial product signal from a NAND circuit (not shown) and to terminal B' is applied a complemented partial product signal from a NAND circuit 20 to the inputs of which are applied an appropriate true binary digit signal from a multiplicand word and an appropriate true binary digit signal from a multiplier word, such as, $a_1$ from multiplicand word $a_0a_1a_2a_3$ and $b_2$ from multiplier word $b_0b_1b_2b_3$. If the adder 12 is used as a half adder, a 0 binary digit is applied to the input terminal $C_i$ so as not to affect the final product. The adder 12 provides a complemented sum signal at the output terminal S' and a complemented carry signal at the output terminal $C'_o$.

The third full adder 14 is similar to the first full adder 10 having input and output terminals at which the same type of signals appear with a NOR circuit 22 having an input signal $a'_0$ from the above identified multiplicand word and an input signal $b'_2$ from the above identified multiplier word. The sum signal from the output terminal S of the first adder 10 is applied to terminal A of the third adder 14. Any appropriate complemented carry signal may be applied to the input terminal $C'_i$. The true sum signal is provided at the output terminal S and the true carry signal is provided at the output terminal $C_o$ of the third adder 14.

The fourth full adder 16 is similar to the second full adder 12 having input and output terminals at which the same type signals appear but with a NAND circuit 24 having an input signal $a_0$ from the above identified multiplicand word and an input signal $b_3$ from the above identified multiplier word. The complemented sum signal from the output terminal S' of the second adder 12 is applied to input terminal A' of the fourth adder. The true carry signal from the output terminal $C_o$ of the third adder 14 is applied to the input terminal $C_i$ of the fourth adder 16. A complemented carry signal is provided at the output terminal $C'_o$ and a complemented sum signal is provided at the output terminal S'. These complemented signals may then be applied to the input terminals of other inverting full adders, not shown in FIG. 1.

It should be noted that the inverting full adders 10 and 14 are of the same type having inputs A, B and $C'_i$ and outputs S and $C_o$, whereas the inverting full adders 12 and 16 are also of the same type but with inputs and outputs being the complements of the inputs and outputs of the adders 10 and 4, i.e., each of the adders 12 and 16 has inputs A', B' and $C_i$ and outputs S' and $C'_o$.

In the operation of the multiplier shown in FIG. 1 of the drawings, complemented binary digits from the multiplicand and multiplier words are applied to the NOR circuit 18 with its output applied to the terminal B and a true sum or true partial product signal is applied to terminal A of the first adder 10, while any appropriate complemented carry signal, or a 1 digit signal, is applied to the input terminal $C'_i$. A true carry signal and a true sum signal are produced at the output terminals $C_o$ and S, respectively. Other complemented binary digits from the multiplicand and multiplier words are applied to the NOR circuit 22 with its output applied to the terminal B of the third adder 14 and the true sum signal from the output of the first adder 10 is applied to terminal A of the third full adder 14, while any appropriate complemented carry signal is applied to terminal $C'_i$ of the third adder 14. Furthermore, still other true binary digits $a_1$ and $b_2$ from the multiplicand and multiplier words are applied to the NAND circuit 20 with its output applied to the terminal B' of the second adder 12 and a complemented sum or complemented partial product signal is applied to terminal A' of the second adder 12, while the true carry signal from the output terminal $C_o$ of the first adder 10 is applied to the input terminal $C_i$. A complemented carry signal and a complemented sum signal are produced at the output terminals S' and $C'_o$, respectively, of adder 12. Additional true binary digits $a_0$ and $b_3$ from the multiplicand and multiplier words are applied to the NAND circuit 24 with its output applied to the input terminal B' of the fourth adder 16 and a complemented sum or partial product signal is applied to the input terminal A' of the fourth adder 16, while the true carry signal from the output terminal $C_o$ of the third adder 14 is applied to the input terminal $C_i$. A complemented carry signal and a complemented sum signal are produced at the output terminals S' and $C'_o$, respectively, of the adder 16.

It should be understood that the multiplicand and multiplier word signals may be provided from any desired source, e. g., a register, with the true and complemented signals applied to the appropriate inputs of the NOR and NAND circuits. If latches are used as the source of the multiplicand and multiplier words, the true signal may be obtained from one side of the latch and the complemented signal taken from the other side of the latch, as is well known.

In known multipliers, true binary digits from multiplicand and multiplier words are generally applied to AND circuits with the outputs of the AND circuits being applied to a non-inverting adder. Such multipliers are relatively slow in producing the sum and carry signals. By using NOR and NAND circuits instead of the AND circuits, the multiplier of this invention has reduced considerably the delay in producing the sum signal at the output of each full adder due to the nature of the NOR and NAND circuits compared with the AND circuits. Furthermore, by using inverting full adders instead of the non-inverting full adders, the multiplier of this invention has reduced considerably the delay in producing the carry signal at the output of each full adder due to the nature of the inverting full adders compared with the non-inverting full adders. Thus, the multiplier of the present invention operates at substantially higher speeds than do the known multipliers. Also, inverting full adders of the N channel device (NMOS) type or of the complementary metal oxide semiconductor (CMOS) type use fewer devices than do the non-inverting full adders and, therefore, the multiplier of the present invention utilizes less area on the surface of a semiconductor substrate or chip than do known multipliers.

Figure 2A:
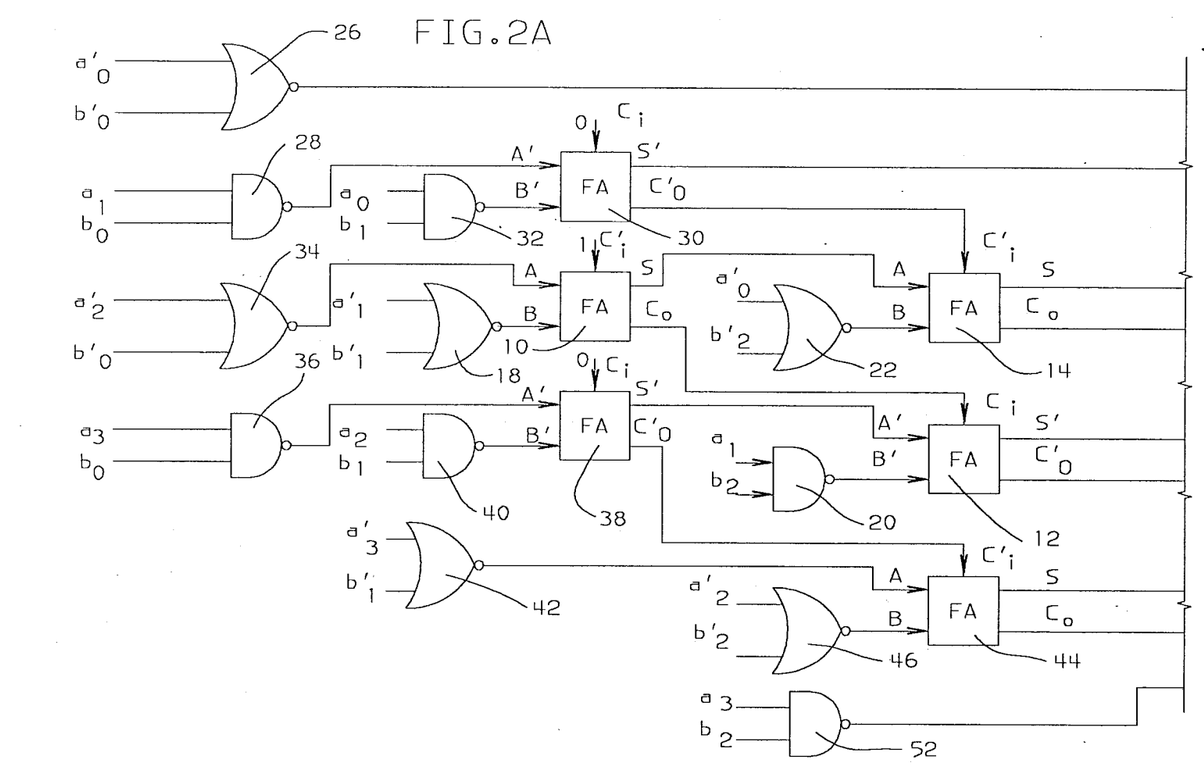
FIGS. 2A and 2B illustrate in some detail a 4×4 multiplier of the present invention which includes the four inverting full adders of the type shown in FIG. 1.
Figure 2B:
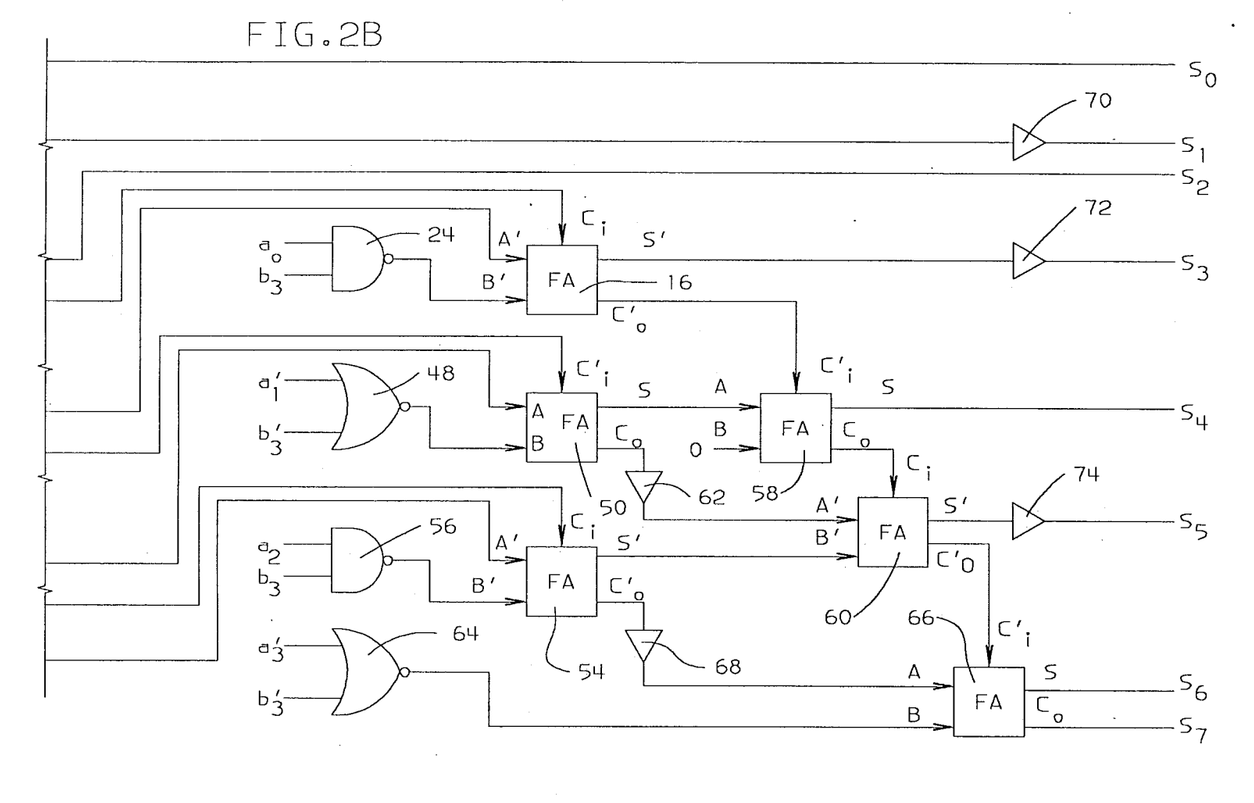

In accordance with the teachings of this invention, a 4×4 multiplier with inverting full adders, including the four inverting full adders of FIG. 1, is illustrated in FIGS. 2A and 2B of the drawings. In FIG. 1 and in FIGS. 2A and 2B like reference characters refer to similar elements. In the multiplier of FIGS. 2A and 2B, the multiplicand word $a_3a_2a_1a_0$ may be multiplied by the multiplier word $b_3b_2b_1b_0$. As indicated in FIGS. 2A and 2B of the drawings, the complemented binary digit $a'_0$ of the multiplicand word and the complemented binary digit $b'_0$ of the multiplier word are applied to the input of a NOR circuit 26, the output of which provides the true partial product signal representing the least significant binary digit $S_0$ of the final product as indicated in FIG. 2B. The binary digit $a_1$ and the binary digit $b_0$ are applied to the inputs of NAND circuit 28 with the output thereof being applied to input terminal A' of inverting full adder 30 and the binary digits $a_0$ and $b_1$ are applied to the inputs of NAND circuit 32 with the output thereof being applied to input terminal B' of adder 30. Since a carry signal is not required at the input terminal $C_i$ of the full adder 30, a 0 binary digit, or a low voltage, such as zero volts, is applied to the terminal $C_i$, or, if desired, a half adder may be used instead of the full adder 30. A complemented sum signal is provided at output terminal S' of the adder 30 and a complemented carry signal is provided at output terminal $C'_o$ of the adder 30. The binary digits $a'_2$ and $b'_0$ are applied to the inputs of NOR circuit 34 with the output thereof being applied to input terminal A of inverting full adder 10 and the binary digits $a'_1$ and $b'_1$ are applied to the inputs of NOR circuit 18 with the output thereof being applied to input terminal B of the inverting full adder 10. Since a carry signal is not required at input terminal $C'_i$ of the full adder 10, a 1 binary digit, or a high voltage, such as five volts, is applied to the terminal $C'_i$, or, if desired, a half adder may be used instead of the full adder 10. A true sum signal is provided at output terminal S of the adder 10 and a true carry signal is provided at output terminal $C_o$ of the adder 10. The binary digits $a_3$ and $b_0$ are applied to the inputs of NAND circuit 36 with the output thereof being applied to input terminal A' of inverting full adder 38 and the binary digits $a_2$ and $b_1$ are applied to the inputs of NAND circuit 40 with the output thereof being applied to the input terminal B' of the adder 38. Again, since a carry signal is not required at input terminal $C_i$ of the full adder 38, a 0 binary digit is applied to the terminal $C_i$. A complemented sum signal is provided at output terminal S' and a complemented carry signal is provided at output terminal $C'_o$ of the full adder 38.

Digits $a'_0$ and $b'_2$ are applied to the inputs of NOR circuit 22 with the output thereof being applied to input terminal B of inverting full adder 14. The true sum signal from the adder 10 is applied to input terminal A and the complemented carry signal from the adder 30 is applied to input terminal $Ci'$ of the full adder 14. A true sum signal is provided at output terminal S and a true carry signal is provided at output terminal $C_o$ of the adder 14. Digits $a_1$ and $b_2$ are applied to the inputs of NAND circuit 20 with the output thereof being applied to input terminal B' of inverting full adder 12. The complemented sum signal from the adder 38 is applied to input terminal A' and the true carry signal from the adder 10 is applied to input terminal $C_i$ of the adder 12. A complemented sum signal is provided at output terminal S' and a complemented carry signal is provided at output terminal $C'_o$ of the adder 12. Digits $a'_3$ and $b'_1$ are applied to inputs of NOR circuit 42 with the output thereof being applied to input terminal A of inverting full adder 44 and digits $a'_2$ and $b'_2$ are applied to the inputs of NOR circuit 46 with the output thereof being applied to input terminal B of the adder 44. A true sum signal is provided at output terminal S and a true carry signal is provided at output terminal $C_o$ of the adder 44.

Digits $a_0$ and $b_3$ are applied to the inputs of NAND circuit 24 with the output thereof being applied to input terminal B' of inverting full adder 16, as illustrated in FIG. 2B of the drawings. The complemented sum signal from the adder 12 is applied to input terminal A' and the true carry signal from the adder 14 is applied to input terminal $C_i$ of adder 16. A complemented sum signal is provided at output terminal S' and a complemented carry signal is provided at output terminal $C'_o$ of the adder 16. Digits $a'_1$ and $b'_3$ are applied to the inputs of NOR circuit 48 with the output thereof being applied to input terminal B of inverting full adder 50. The true sum signal from adder 44 is applied to input terminal A and the complemented carry signal from the adder 12 is applied to input terminal $C'_i$ of adder 50. A true sum signal is provided at output terminal S and a true carry signal is provided at output terminal $C_o$ of the adder 50. Digits $a_3$ and $b_2$ are applied to the inputs of NAND circuit 52 with the output thereof being applied to input terminal A' of inverting full adder 54, and digits $a_2$ and $b_3$ are applied to the inputs of NAND circuit 56 with the output thereof being applied to input terminal B' of the adder 54. The true carry signal from adder 44 is applied to input terminal $C_i$ of the adder 54. A complemented sum signal is provided at output terminal S' and a complemented carry signal is provided at output terminal $C'_o$ of the adder 54.

Inverting full adder 58 has an input terminal A to which is applied the true sum signal from the output terminal S of the adder 50 and an input terminal $C'_i$ to which is applied the complemented carry signal from the output terminal $C'_o$ of the adder 16. Since binary digits from the multiplicand or multiplier words need not be applied to the adder 58, a 0 digit signal is applied to terminal B of the adder 58. If desired, adder 58 may be a half adder. A true sum signal is provided at output terminal S and a true carry signal is provided at output terminal $C_o$ of the adder 58. Inverting full adder 60 has an input terminal A' to which is applied the true carry signal from output terminal $C_o$ of adder 50 after it is passed through an inverter 62 so as to arrive at the input terminal A' as a complemented carry signal. The complemented sum signal from the output terminal S' of the adder 54 is applied to input terminal B' and the true carry signal from the output terminal $C_o$ of the adder 58 is applied to input terminal $C_i$ of the adder 60. A complemented sum signal is provided at output terminal S' and a complemented carry signal is provided at output terminal $C'_o$ of the adder 60. Digits $a'_3$ and $b'_3$ are applied to the inputs of NOR circuit 64 with the output thereof being applied to terminal B of inverting full adder 66. The adder 66 has an input terminal A to which is applied the complemented carry signal from output terminal $C'_o$ of the adder 54 after it is passed through an inverter 68 so as to arrive at the input terminal A as a true carry signal and an input terminal $C'_i$ to which is applied the complemented carry signal from the output terminal $C'_o$ of the adder 60. A true sum signal is provided at output terminal S and a true carry signal is provided at output terminal $C_o$ of the adder 66.

It can be seen from FIGS. 2A and 2B that this $4 \times 4$ multiplier of the present invention provides the required eight digits of the final product from the least significant digit $S_0$ to the most significant digit $S_7$. As stated hereinabove, the least significant digit $S_0$ is obtained from the output of the NOR circuit 26. The next least significant digit $S_1$ is obtained from the terminal S' of the adder 30 after it passes through an inverter 70. Final product digit $S_2$ is obtained from output terminal S of the adder 14, with digit $S_3$ being obtained from the output terminal S' of the adder 16 after it passes through an inverter 72, digit $S_4$ being obtained directly from the output terminal S of the adder 58 and digit $S_5$ being obtained from terminal S' of the adder 60 after it passes through an inverter 74. The next to the most significant digit $S_6$ is obtained from the output terminal S and the most significant digit $S_7$ is obtained from the output terminal $C_o$ of the inverting full adder 66.

It should be understood that the full adder circuits 10, 12, 14, 16, 30, 38, 44, 50, 54, 58, 60 and 66 are each of the inverting type and each preferably has the same circuit. Furthermore, it should be noted that when a complemented carry signal from the output terminal $C'_o$ of a first adder is applied to the input terminal $C'_i$ of a second adder, the remaining input terminals of the second adder and both outputs of the second adder contain true signals. Likewise, the other output terminal and two of the three input terminals of the first adder contain complemented signals, with the third input terminal of the first adder containing a true signal. Thus, it can also be seen that even though the circuits of each of the inverting full adders are the same, the adders of the multiplier of this invention have two basic polarity arrangements, i. e., the first adders contain complemented signals at input terminals A' and B', or more specifically, at complemented polarity signal input terminals A' and B', and at output terminals S' and $C'_o$, or more specifically, at complemented polarity signal output terminals S' and $C'_o$, with a true signal at input terminal $C_i$, or more specifically, at true polarity signal input terminal $C_i$, and the second adders contain true signals at input terminals A and B, or more specifically, at true polarity signal input terminals A and B, and at output terminals S and $C_o$, or more specifically, at true polarity signal output terminals S and $C_o$, with a complemented signal at input terminal $C'_i$, or more specifically, at complemented polarity signal input terminal $C'_i$. Accordingly, each of the first adders have inputs $A'B'C_i$ and outputs $S'C'_o$ and each of the second adders have inputs $ABC'_i$ outputs $SC_o$, i. e., the inputs of the first adders have the complemented or opposite polarity signals compared to the polarity of the signals of the inputs of the second adders, and the output of the first adders have complemented or opposite polarity signals compared to the polarity of the signals of the outputs of the second adders. It should be further noted that NAND circuits or means have their outputs connected to the inputs of the first adders with the inputs of the NAND circuits having true binary digit signals from the multiplicand and multiplier words applied thereto and that NOR circuits or means have their outputs connected to the inputs of the second adders with the inputs of the NOR circuits having complemented binary digit signals from the multiplicand and multiplier words applied thereto.

Figure 3:
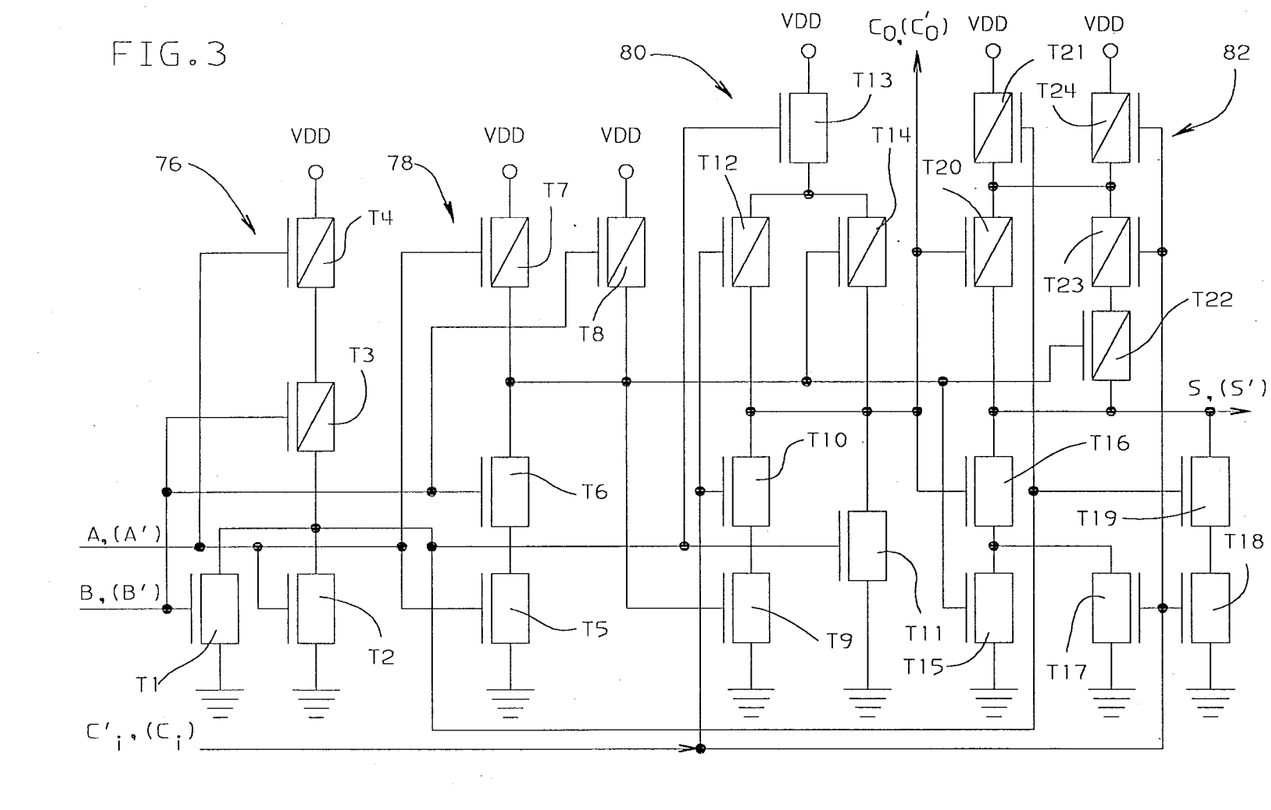
FIG. 3 illustrates a circuit diagram of an inverting full adder that can be used for each of the adders indicated in FIG. 1 and FIGS. 2A and 2B, and FIGS. 4–14, patterns after

In the practice of this invention, any known circuits may be used for the NOR circuits, NAND circuits, inverters and the inverting full adders, however, a preferred inverting full adder of the complementary metal oxide semiconductor (CMOS) type is illustrated in FIG. 3 of the drawings. The inverting full adder circuit of FIG. 3 of the drawings has terminals with complemented and true polarity signals thereat arranged as in, e. g., the adder 10 in FIG. 1 and FIGS. 2A and 2B of the drawings. This inverting full adder includes NOR, or inverting OR, circuit or means 76 having N channel pull down transistors T1 and T2 and P channel pull up transistors T3 and T4 with an input terminal receiving a true polarity signal A connected to transistors T2 and T4 and an input terminal receiving a true polarity signal B connected to transistors T1 and T3. The adder also includes a NAND, or inverting AND, circuit or means 78 having N channel pull down transistors T5 and T6 and P channel pull up transistors T7 and T8, with true polarity signal A being applied to transistors T5 and T7 and true polarity signal B being applied to transistors T6 and T8. The adder further includes an AND-OR-INVERT (AOI) circuit 80 having N channel pull down transistors T9, T10 and T11 and P channel pull up transistors T12, T13 and T14, with the output of the NOR circuit 76 being connected to transistors T11 and T13, the output of the NAND circuit 78 being connected to transistors T9 and T14 and transistors T10 and T12 receiving a complemented carry-in signal $C'_i$. The output of the AOI circuit 80 is provided with a true polarity carry signal $C_o$. Also included in the adder is an OR-AND-OR-INVERT (OAOI) circuit 82 having N channel pull-down transistors T15, T16, T17, T18 and T19 and P channel pull-up transistors T20, T21, T22, T23 and T24, with the output of the NOR circuit 76 being connected to transistors T19 and T21, the output of the NAND circuit 78 being connected to transistors T15 and T22, the output of AOI circuit 80 being connected to transistors T16 and T20, and transistors T17, T18, T23 and T24 receiving the complemented carry-in signal $C'_i$. The output of the OAOI circuit is provided with a true polarity sum signal S. A voltage supply terminal VDD may have a positive voltage of, e. g., 3 to 5 volts applied thereto. It can be seen that the inverting full adder of FIG. 3 has true polarity signal input terminals A and B and complemented polarity carry signal input terminal $C'_i$ with true polarity carry signal output terminal $C_o$ and true polarity sum signal output terminal S, which is similar to that of adder 10 of FIG. 1 and of FIGS. 2A and 2B. It can also be seen, as indicated in FIG. 3 of the drawings in parenthesis, that the inverting full adder of FIG. 3 may, alternatively, have complemented polarity signal input terminals A' and B' and true polarity carry signal input terminal $C_i$ with a complemented polarity carry output terminal $C'_o$ and a complemented polarity sum signal output terminal S', which has similar polarities as that of, e. g., adder 12 of FIGS. 1 and 2 of the drawings. Referring again to the circuit of FIG. 3 in more detail, it can be seen that the carry-in signal at terminal $C'_i$ or terminal $C_i$, is applied to the input of the AOI circuit 80 with the carry-out signal being produced at the output of the AOI circuit 80, i. e., at output terminal $C_o$, or output terminal $C'_o$. Thus, there is only one stage of delay between the input carry signal terminal and the output carry signal terminal in the inverting full adder circuit. It should also be understood that an all N channel transistor inverting full adder may be used in the practice of this invention, as well as CMOS adders.

Figure 4:
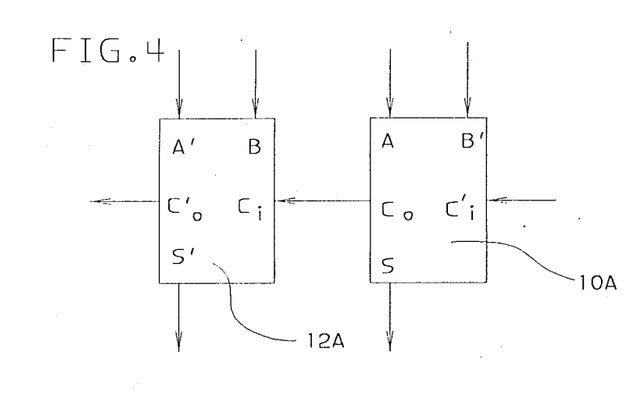
Figure 5:
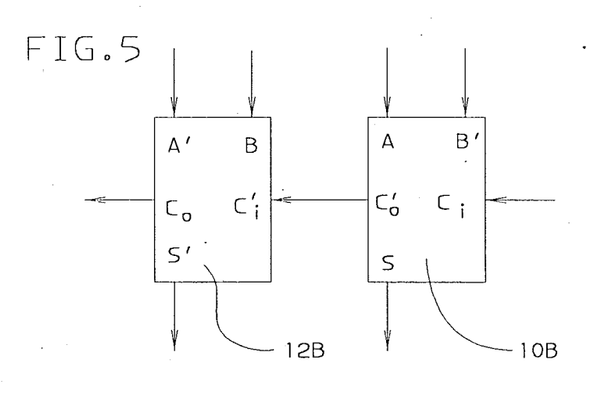
Figure 6:
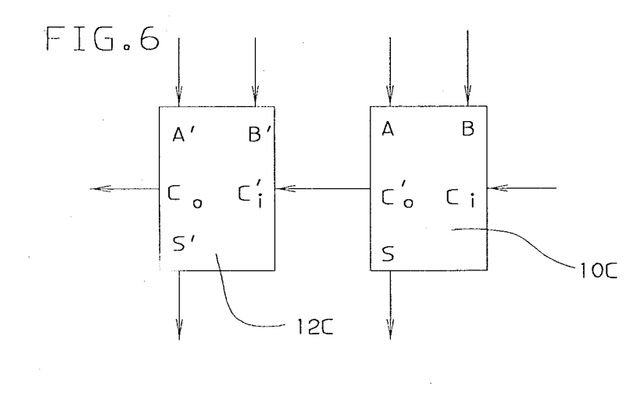
Figure 7:
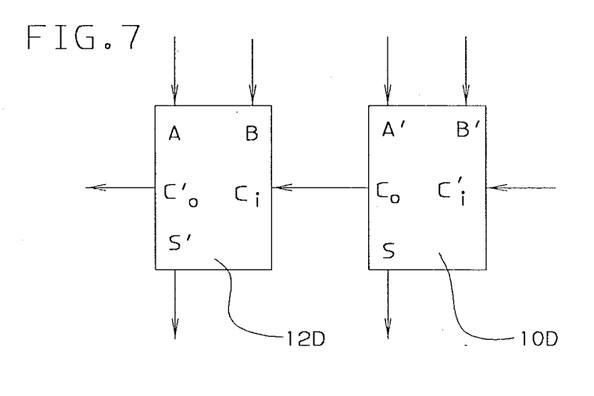
Figure 8:
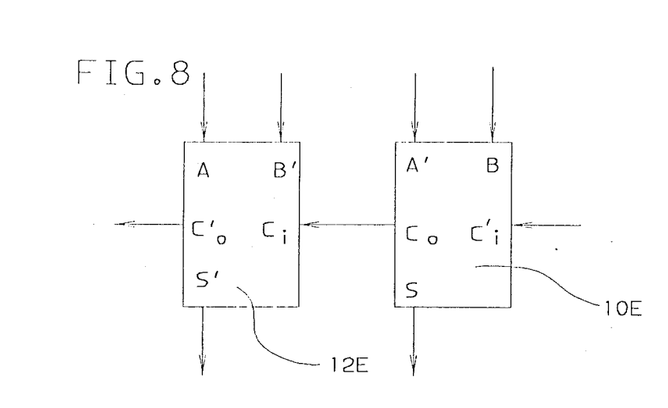
Figure 9:
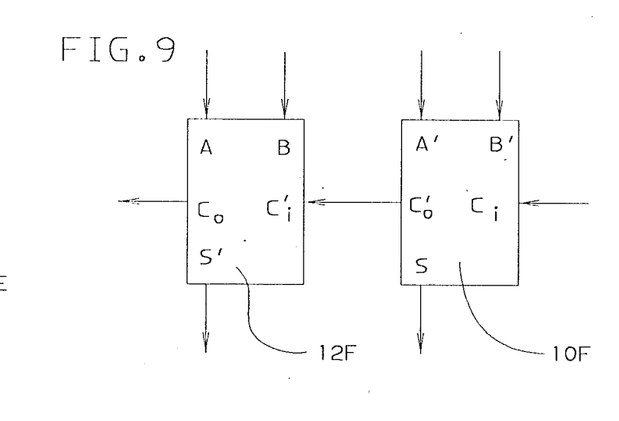
Figure 10:
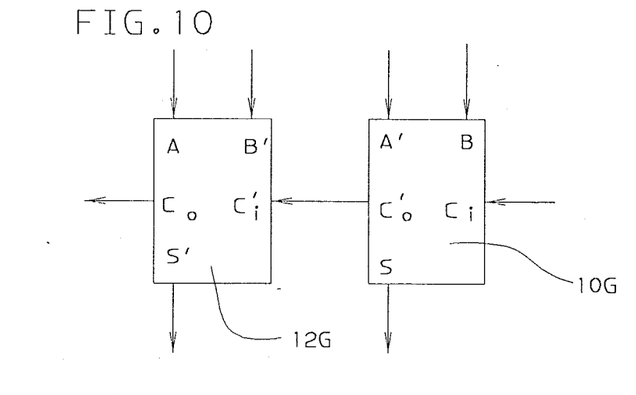
Figure 11:
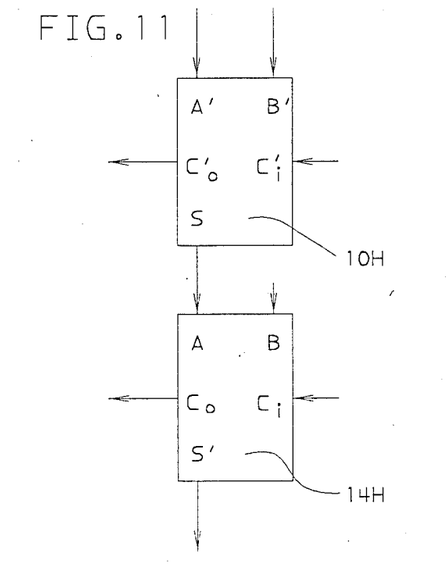
Figure 12:
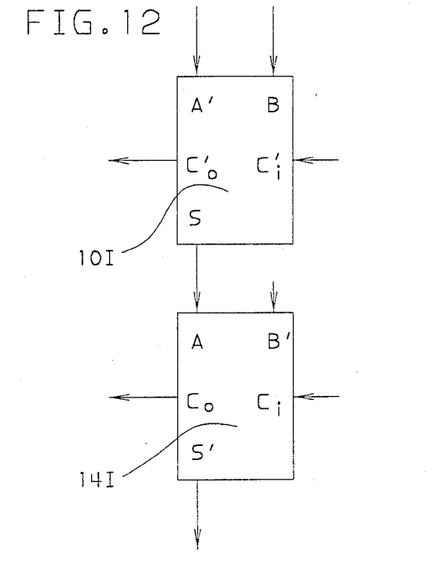
Figure 13:
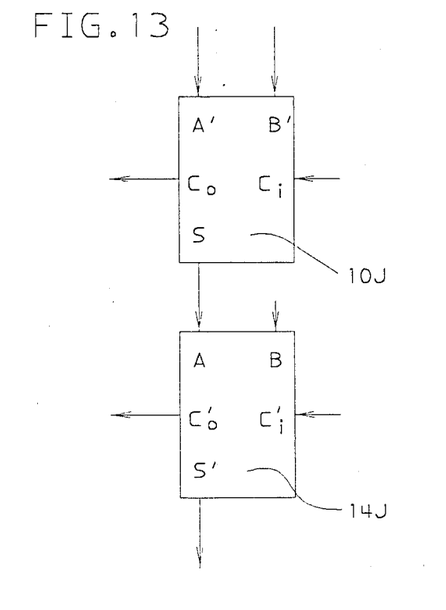
Figure 14:
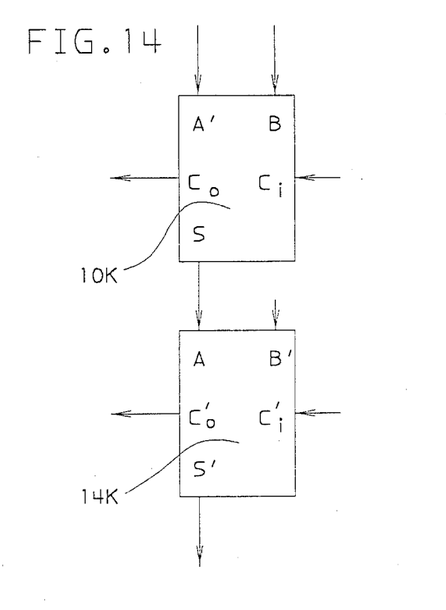

It is to be noted again that in the adders of the multiplier of FIG. 1 and of FIGS. 2A and 2B, the same type of circuit is used in each of the adders but with some adders, such as adders 10 and 14, having inputs A, B and $C'_i$ and outputs S and $C_o$, while the remaining adders, such as adders 12 and 16, have inputs A', B' and $C_i$ and outputs S' and $C'_o$. It should be understood that this invention is not limited to a multiplier having some adders with inputs $ABC'_i$ and outputs $SC_o$ and other adders with inputs $A'B'C_i$ and outputs $S'C'_o$. A multiplier in accordance with the teachings of this invention may also have first adders with inputs $AB'C'_i$ and outputs $SC_o$ and second adders with inputs A'BC and outputs $S'C'_o$, as indicated at 10A and 12A, respectively, in FIG. 4 of the drawings. Other multipliers in accordance with the teachings of this invention may have first adders with inputs $AB'C_i$ and outputs $SC'_o$ and second adders with inputs $A'BC'_i$ and outputs $S'C_o$, as indicated at 10B and 12B, respectively, in FIG. 5, also may have first adders with inputs $ABC_i$ and outputs $SC'_o$ and second adders with inputs $A'B'C'_i$ and outputs $S'C_o$, as indicated at 10C and 12C, respectively, in FIG. 6, may have first adders with inputs $A'B'C'_i$ and outputs $SC_o$ and second adders with inputs $ABC_i$ and outputs $S'C'_o$, as indicated at 10D and 12D, respectively, in FIG. 7, may have first adders with inputs $A'BC'_i$ and outputs $SC_o$, as indicated at 10E and 12E, respectively, in FIG. 8, may have first adders with inputs $A'B'C_i$ and outputs $SC'_o$ and second adders with inputs $ABC'_i$ and outputs $S'C_o$, as indicated at 10F and 12F, respectively, in FIG. 9, may have first adders with inputs $A'BC_i$ and outputs $SC'_o$ and second adders with inputs $AB'C'_i$ and outputs $S'C_o$, as indicated at 10G and 12G, respectively, in FIG. 10, may have first adders with inputs $A'B'C'_i$ and outputs $SC'_o$ and second adders with inputs $ABC_i$ and outputs $S'C_o$, as indicated at 10H and 14H, respectively, in FIG. 11, may have first adders with inputs $A'BC'_i$ and outputs $SC'_o$ and second adders with inputs $AB'C_i$ and outputs $S'C_o$, as indicated in 10I and 14I, respectively, in FIG. 12, may have first adders with inputs $A'B'C_i$ and outputs $SC_o$, and second adders with inputs $ABC'_i$ and outputs $S'C'_o$ as indicated in 10J and 14J, respectively, in FIG. 13, and may have first adders with inputs $A'BC_i$ and outputs $SC_o$, and second adders with inputs $AB'C'_i$ and outputs $S'C'_o$, as indicated at 10K and 14K, respectively, in FIG. 14.

It should be understood that in each instance or in each embodiment of the invention a true polarity signal output terminal, such as sum output terminal S, of a first type adder must be connected to a true polarity signal input terminal, such as terminal A, regardless of whether the terminal A adder is of the first type or of the second type and that a complemented polarity signal output terminal, such as terminal $C'_o$, of a first type adder must be connected to a complemented polarity carry signal input terminal $C'_i$, regardless of whether the terminal $C'_i$ adder is of the first type or of the second type. Furthermore, input signals to NOR circuits must be complemented with the output signals thereof connected to a true polarity signal input terminal of an adder and input signals to NAND circuits must be true with the outputs thereof connected to a complemented polarity signal input terminal.

It can be seen that in each of these many embodiments of the multiplier of the present invention inverting full adders are used wherein the carry signals are propagated through the multiplier in a minimal amount of time and, likewise, with NOR and NAND circuits connected to the input of the inverting full adders, the sum signals are also propagated through the multiplier in a minimal amount of time to rapidly provide a final arithmetic product. A further advantage of the multiplier of the present invention is that, since the circuits of which the multiplier is formed utilize a minimum amount of devices, the required surface of a semiconductor wafer or chip is also minimal.

It should be noted that although a 4×4 multiplier of the present invention is illustrated, larger multipliers, such as a 16×16 multiplier, may be made in accordance with the teachings of this invention. In such larger multipliers, the sum output signals from first and second inverting full adders will be applied to first and second input terminals, respectively, of a third inverting full adder, with the carry-in signal applied to the third input terminal.

While the invention has been particularly shown and described with reference to preferred embodiments thereof, it will be understood by those skilled in the art that various changes in form and details may be made therein without departing from the spirit and scope of the invention.

What is claimed is:

1. A multiplier comprising
    first and second inverting full adders, each of said adders having first, second and third input terminals and first and second output terminals, at least one of said terminals of said first adder having signals thereat of a true polarity and the remaining terminals of said first adder having signals thereat of complemented polarity, corresponding terminals of said first and second adders having signals thereat of opposite polarities,
    means for connecting one output terminal of said first adder to one of said input terminals of said second adder, said one output terminal of said first adder and said one input terminal of said second adder having signals thereat of similar polarities,
    means including a NOR circuit for applying true binary digit signals to a true polarity input terminal of one of said adders, and
    means including a NAND circuit for applying complemented polarity binary digit signals to a complemented polarity input terminal of the other of said adders.

2. A multiplier as set forth in claim 1 wherein the output of said NOR circuit is applied to one of the true polarity terminals of said first adder and the output of said NAND circuit is applied to one of the complemented polarity input terminals of said second adder.

3. A multiplier as set forth in claim 1 wherein true binary digit signals are applied to the inputs of said NAND circuit and complemented binary digit signals are applied to the inputs of said NOR circuit.

4. A multiplier as set forth in claim 1 further including means for applying binary digit carry signals to another one of said input terminals of said first adder and means for applying a partial product signal to each of said third input terminals of said first and second adders.

5. A multiplier as set forth in claim 1 wherein the first, second and third input terminals of said first adder have signals of the polarities $ABC'_i$, respectively, and the first and second output terminals have signals of polarities $SC_o$, respectively, wherein input signal $C'_i$ is a carry-in signal and output signal $C_o$ is a carry-out signal, and the first, second and third input terminals of said second adder have signals of the polarities $A'B'C_i$, respectively, and the first and second output terminals have signals of polarities $S'C'_o$, respectively, wherein input signal $C_i$ is a carry-in signal and output signal $C'_o$ is a carry-out signal, and said output terminal signal $C_o$ is connected to said input terminal having signal $C_i$.

6. A multiplier as set forth in claim 1 wherein the first, second and third input terminals of said first adder have signals of polarities $AB'C'_i$, respectively, and the first and second output terminals have signals of polarities $SC_o$, respectively, wherein input signal $C'_i$ is a carry-in signal and output signal $C_o$ is a carry-out signal, and the first, second and third input terminals of said second adder have signals of the polarities $A'BC_i$, respectively, and the first and second output terminals have signals of polarities $S'C'_o$, respectively, wherein input signal $C_i$ is a carry-in signal and output signal $C'_o$ is a carry-out signal, and said output terminal signal $C_o$ is connected to said input terminal having signal $C_i$.

7. A multiplier as set forth in claim 1 wherein the first, second and third input terminals of said first adder have signals of the polarities $AB'C_i$, respectively, and the first and second output signals have signals of polarities of $SC'_o$, respectively, wherein input signal $C_i$ is a carry-in signal and output signal $C'_o$ is a carry-out signal, and the first, second and third input terminals of said second adder have signals of the polarities of $A'BC'_i$, respectively, and the first and second output terminals have signals of polarities $S'C_o$, respectively, wherein input signal $C'_i$ is a carry-in signal and output signal $C_o$ is a carry-out signal, and said output terminal having signal $C'_o$ is connected to said input terminal having signal $C'_i$.

8. A multiplier as set forth in claim 1 wherein said first, second and third input terminals of said first adder have signals of the polarities $ABC_i$, respectively, and the first and second output terminals have signals of polarities $SC'_o$, respectively, wherein input signal $C_i$ is a carry-in signal and output signal $C'_o$ is a carry-out signal, and the first, second and third input terminals of said second adder have signals of the polarities $A'B'C'_i$, respectively, and the first and second output terminals have signals of polarities $S'C_o$, respectively, wherein input signal $C'_i$ is a carry-in signal and output signal $C_o$ is a carry-out signal, and said output terminal having signal $C'_o$ is connected to said input terminal having signal $C'_i$.

9. A multiplier as set forth in claim 1 wherein the first, second and third input terminals of said first adder have signals of the polarities $A'B'C'_i$, respectively, and the first and second output terminals have signals of polarities $SC_o$, respectively, wherein input signal $C'_i$ is a carry-in signal and output signal $C_o$ is a carry-out signal and the first, second and third input terminals of said second adder have signals of the polarities $ABC_i$, respectively, and the first and second output terminals have signals of polarities $S'C'_o$, wherein input signal $C_i$ is a carry-in signal and output signal $C'_o$ is a carry-out signal, and said output terminal having signal $C_o$ is connected to said input terminal having signal $C_i$.

10. A multiplier as set forth in claim 1 wherein the first, second and third input terminals of said first adder have signals of the polarities $A'BC'_i$, respectively, and the first and second output terminals have signals of polarities of $SC_o$, respectively, wherein input signal $C'_i$ is a carry-in signal and output signal $C_o$ is a carry-out signal, and the first, second and third input terminals of said second adder have signals of the polarities $AB'C_i$, respectively, and the first and second output terminals have signals of polarities $S'C'_o$, wherein input signal $C_i$ is a carry-in signal and output signal $C'_o$ is a carry-out signal, and said output terminal having signal $C_o$ is connected to said input terminal having signal $C_i$.

11. A multiplier as set forth in claim 1 wherein the first, second and third input terminals of said first adder have signals of the polarities $A'B'C_i$, respectively, and the first and second output terminals having signals of polarities of $SC'_o$, respectively, wherein input signal $C_i$ is a carry-in signal and output signal $C'_o$ is a carry-out signal, and the first, second and third input terminals of said second adder have signals of the polarities of $ABC'_i$, respectively, and the first and second output terminals have signals of polarities of $S'C_o$, respectively, wherein input signal $C'_i$ is a carry-in signal and output signal $C_o$ is a carry-out signal, and said output terminal having signal $C'_o$ is connected to said input terminal having signal $C'_i$.

12. A multiplier as set forth in claim 1 wherein the first, second and third input terminals of said first adder have signals of the polarities of $A'BC_i$, respectively, and the first and second output terminals have signals of the polarities of $SC'_o$, respectively, wherein input signal $C_i$ is a carry-in signal and output signal $C'_o$ is a carry-out signal, and the first, second and third input terminals of said second adder have signals of the polarities $AB'C'_i$, respectively, and the first and second output terminals have signals of polarities $S'C_o$, respectively, wherein input signal $C'_i$ is a carry-in signal and output signal $C_o$ is a carry-out signal, and said output terminal having signal $C'_o$ is connected to said input terminal having signal $C'_i$.

13. A multiplier as set forth in claim 1 wherein the first, second and third input terminals of said first adder have signals of the polarities $A'B'C'_i$, respectively, and the first and second output terminals have signals of the polarities of $SC'_o$, respectively, wherein input signal $C'_i$ is a carry-in signal and output signal $C'_o$ is a carry-out signal, and the first, second and third input terminals of said second adder have signals of the polarities $ABC_i$, respectively, and the first and second output terminals have signals of the polarities of $S'C_o$, respectively, wherein input signal $C_i$ is a carry-in signal and output signal $C_o$ is a carry-out signal and said output terminal having signal $S$ of said first adder is connected to the input terminal having signal $A$ of said second adder.

14. A multiplier as set forth in claim 1 wherein the first, second and third input terminals of said adder have signals of the polarities $A'BC'_i$, respectively, and the first and second output terminals have signals of the polarities $SC'_o$, respectively, wherein input signal $C'_i$ is a carry-in signal and output signal $C'_o$ is a carry-out signal, and the first, second and third input terminals of said second adder have signals of the polarities $AB'C_i$, respectively, and the first and second output terminals have signals of the polarities $S'C_o$, respectively, wherein input signal $C_i$ is a carry-in signal and output signal $C_o$ is a carry-out signal, and said output terminal having signal S of said first adder is connected to said input terminal having signal A of said second adder.

15. A multiplier as set forth in claim 1 wherein the first, second and third input terminals of said first adder have signals of the polarities of $A'B'C_i$, respectively, and the first and second output terminals have signals of the polarities $SC_o$, respectively, wherein input signal $C_i$ is a carry-in signal and output signal $C_o$ is a carry-out signal, and the first, second and third input terminals of said second adder have signals of the polarities of $ABC'C'_i$, respectively, and the first and second output terminals have signals of the polarities $S'C'_o$, respectively, wherein input signal $C'_i$ is a carry-in signal and output signal $C'_o$ is a carry-out signal, and said output terminal having signal S is connected to said input terminal having signal A of said second adder.

16. A multiplier as set forth in claim 1 wherein the first, second and third input terminals of said first adder have signals of the polarities $A'BC_i$, respectively, and the first and second output terminals have signals of the polarities of $SC_o$, respectively, wherein input signal $C_i$ is a carry-in signal and output signal $C_o$ is a carry-out signal, and the first, second and third input terminals of said second adder have signals of the polarities $AB'C'_i$, respectively, and the first and second output terminals have signals of the polarities of $S'C'_o$, respectively, wherein input signal $C'_o$ is a carry-in signal and output signal is a carry-out signal, and said output terminal having signal S is connected to said input terminal having signal A of said second adder.

17. A multiplier comprising
first and second inverting full adders, each of said adders having first, second and third input terminals and first and second output terminals, at least one of which has a true polarity signal thereat and another of which has a complemented polarity signal, said first output terminal of said first adder being connected to the first input terminal of said second adder, said first, second and third input terminals and said first and second output terminals of said second adder having a relationship with respect to the input and output terminals of said first adder such that corresponding input and output terminals have signals of opposite polarities,
means including a NOR circuit for applying true binary digit signals to a true polarity input terminal of said first adder, and
means including a NAND circuit for applying complemented binary digit signals to a complemented polarity input terminal of said second adder.

18. A multiplier comprising
first and second inverting full adders, each of said adders having first, second and third input terminals and first and second output terminals, at least one of which has a true polarity signal thereat and another of which has a complemented polarity signal, said first output terminal of said first adder being connected to the first input terminal of said second adder, said first, second and third input terminals and said first and second output terminals of said second adder having a relationship with respect to the input and output terminals of said first adder such that true signals are applied to the second and third inputs of one of said first and second adders and complemented signals are applied to the second and third inputs of the other of said first and second adders and true signals are produced at the first and second outputs of said one of said first and second adders and complemented signals are produced at the first and second outputs of said other of said first and second adders.

19. A multiplier as set forth in claim 18 wherein said first output of said first adder is a carry output and said first input of said second adder is a carry input.

20. A multiplier comprising
first and second inverting full adders, each of said adders having first, second and third inputs and first and second outputs, said first output of said first adder being connected to the first input of said second adder, signals of true and complemented states being applied to the first, second and third inputs of each of said first and second adders with signals of one of said states being applied to the first input of said first adder and signals of the other of said states being applied to the first input of said second adder, signals of one of said states being applied to the second input of said first adder and signals of the other of said states being applied to the second input of said second adder, signals of one of said states being applied to the third input of said first adder and signals of the other of said states being applied to the third input of said second adder, the first output of said first adder having signals of one of said states and the first output of said second adder having signals of the other of said states and the second output of said first adder having signals of one of said states and the second output of said second adder having signals of the other of said states.

21. In a multiplier, a circuit comprising
an inverting full adder having first, second and third input terminals,
NAND means for applying a complemented first partial product signal to said first input terminal,
NAND means for applying a complemented second partial product signal to said second input terminal, and
means for applying a true carry signal to said third input terminal.

22. A multiplier comprising
first, second and third inverting full adders each having three inputs for receiving signals of true or complemented polarity and first and second outputs,
said second adder having corresponding inputs of opposite polarity to those of the first adder and said third adder having corresponding inputs of the same polarity as those of the first adder,
means for connecting the first output of said first adder to one of the inputs of said second adder, and
means for connecting the second output of said first adder to the first input of said third adder.

23. A multiplier comprising
first, second and third inverting full adders each having three inputs for receiving signals of true or complemented polarities and first and second outputs,
said second and third adders having corresponding inputs of opposite polarity to that of the first adder, means for connecting the first output of said first adder to one of the inputs of said second adder, and means for connecting one of the outputs of said second adder to one of the inputs of said third adder.

24. In a multiplier, a circuit comprising a full adder including output means for providing complemented polarity sum and carry signals and having first, second and third inputs, a first NAND circuit having means for applying first and second true input signals thereto and means for applying an output therefrom to the first input of said adder, a second NAND circuit having means for applying third and fourth true input signals thereto and means for applying an output therefrom to the second input of said adder, and means for applying a true carry signal to the third input of said adder.

25. In a multiplier, a circuit comprising a full adder including output means for providing true polarity sum and carry signals and having first, second and third inputs, a first NOR circuit having means for applying first and second complemented input signals thereto and means for applying an output therefrom to the first input of said adder, a second NOR circuit having means for applying third and fourth complemented input signals thereto and means for applying an output therefrom to the second input of said adder, and means for applying a complemented carry signal to the third input of said adder.

26. In a multiplier, a circuit comprising an inverting full adder having first, second and third input terminals, NOR means for applying a true first partial product signal to said first input terminal, NOR means for applying a true second partial product signal to said second input terminal, and means for applying a complemented carry signal to said third input terminal.

27. A multiplier comprising first and second full adders, each of said adders having a sum input, sum output, and a carry output with the carry output of said first adder being connected to an input of said second adder, said first adder having a given carry input, a first NAND circuit, a first NOR circuit, and means for coupling the output of one of said circuits to said first adder and the output of the other of said circuits to said second adder.

28. A multiplier as set forth in claim 27 wherein said NOR circuit is coupled to said first full adder and said NAND circuit is coupled to said second full adder, said NAND circuit having first and second true polarity signals applied thereto and said NOR circuit having third and fourth complemented polarity signals applied thereto.

29. A multiplier as set forth in claim 28 wherein the sum input to said first full adder includes a true signal, said given carry input includes a complemented polarity carry signal and the sum input to said second full adder includes a complemented polarity sum signal.

30. A multiplier as set forth in claim 27 wherein said NAND circuit is coupled to said first full adder and said NOR circuit is coupled to said second full adder, said NAND circuit having first and second true polarity signals applied thereto and said NOR circuit having third and fourth complemented polarity signals applied thereto.

31. A multiplier as set forth in claim 30 wherein the sum input to said first full adder includes a complemented polarity sum signal, said given carry input includes a true polarity carry signal and the sum input to said second full adder includes a true polarity sum signal.

32. A multiplier as set forth in claim 27 further including a third full adder having a sum input, a carry input, a sum output and a carry output with the sum output being connected to an input of said second full adder and a first logic circuit having first and second inputs and an output coupled to said third full adder.

33. A multiplier as set forth in claim 32 wherein said logic circuit is a second NAND circuit and said first NAND circuit is coupled to said second full adder.

34. A multiplier as set forth in claim 32 wherein said logic circuit is a second NOR circuit and said first NOR circuit is coupled to said second full adder.

35. A multiplier as set forth in claim 32 further including a fourth full adder having first, second and third inputs, a sum output and a carry output, said sum output being coupled to said sum input of said first full adder and said carry output being connected to said carry input of said third full adder and a second logic circuit having first and second inputs and an output coupled to the first input of said fourth full adder.

36. A multiplier as set forth in claim 35 wherein said first logic circuit is a second NOR circuit and the output of said first NOR circuit is coupled to said second full adder and the second logic circuit is a NAND circuit and the output of said first NAND circuit is coupled to said first full adder 37. A multiplier as set forth in claim 35 wherein said first logic circuit is a second NAND circuit and the output of the first NAND circuit is coupled to said second full adder and the second logic circuit is a NOR circuit and the output of said first NOR circuit is coupled to said first full adder.

* * * * *